Oct. 7, 1947.  F. E. BIDDLE  2,428,348
FILM GATE FOR CAMERAS
Filed June 30, 1945  5 Sheets-Sheet 1
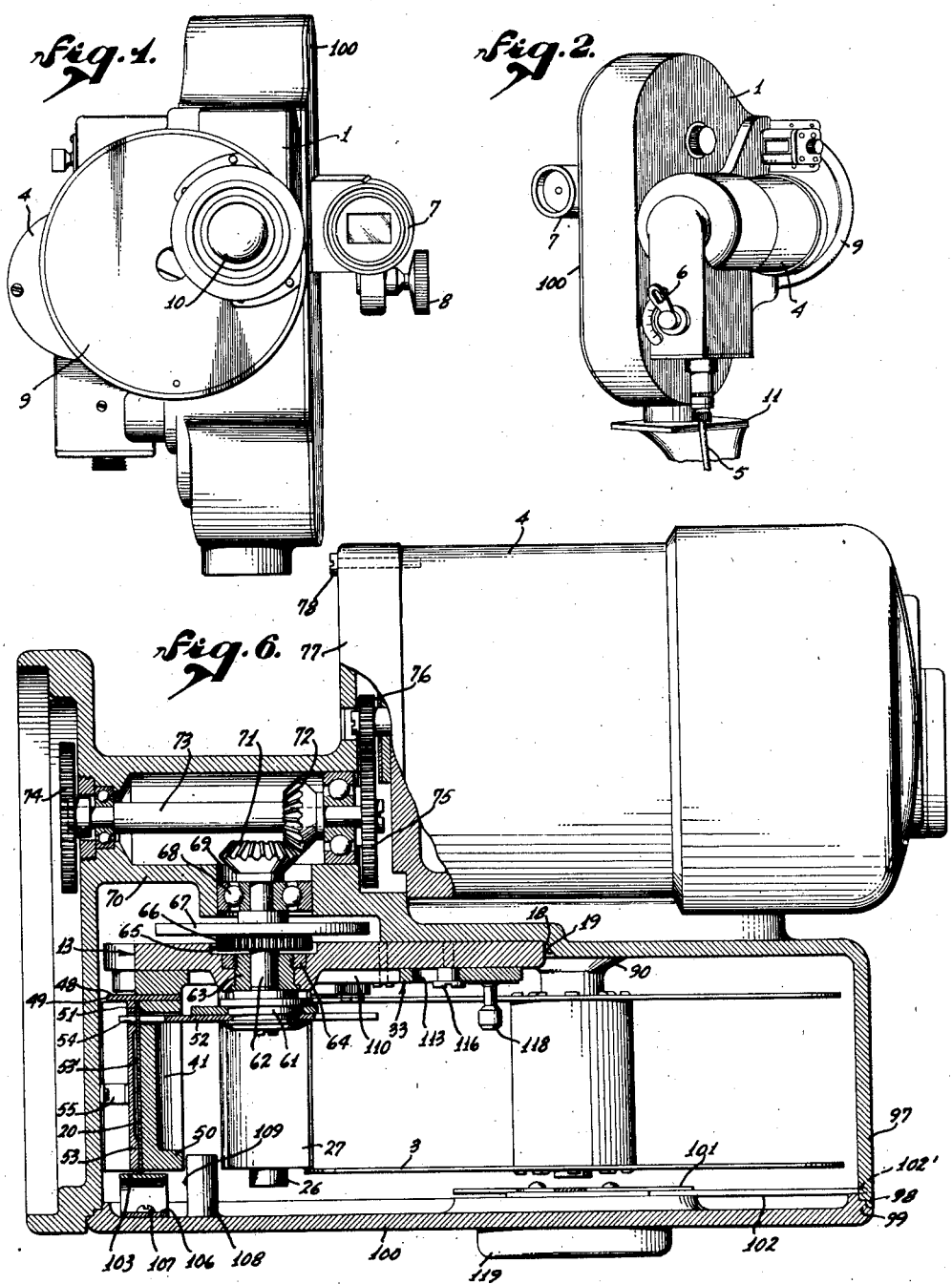
INVENTOR:
FRANK E. BIDDLE
BY
ATTORNEY.

Oct. 7, 1947.  F. E. BIDDLE  2,428,348
FILM GATE FOR CAMERAS
Filed June 30, 1945   5 Sheets-Sheet 2

INVENTOR:
FRANK E. BIDDLE
BY W. E. Beatty
ATTORNEY.

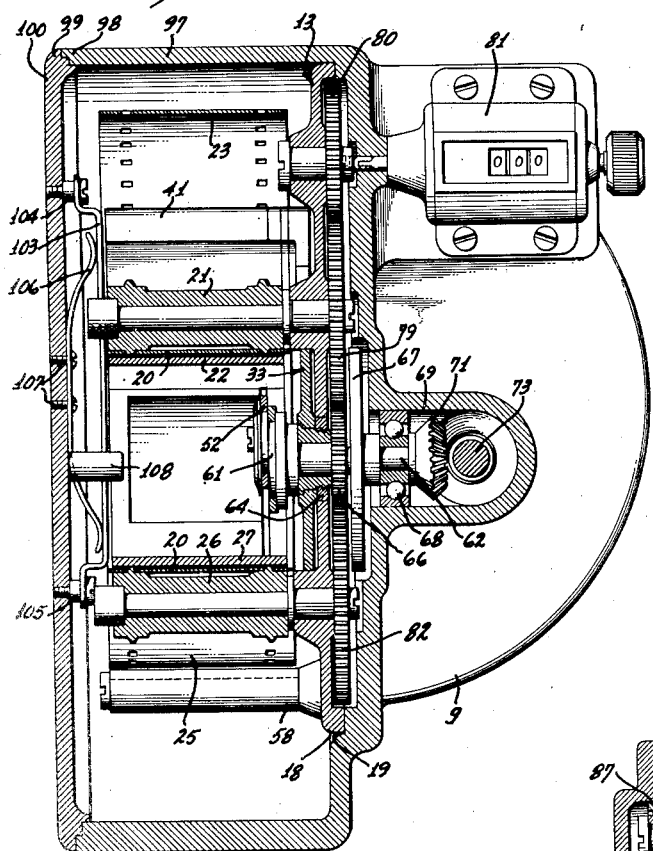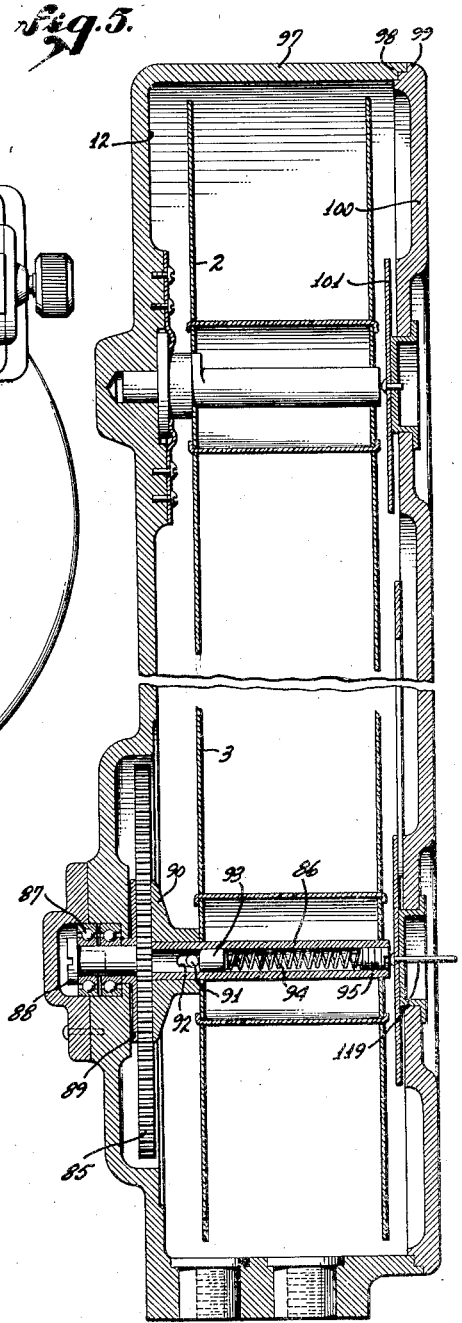

Oct. 7, 1947.  F. E. BIDDLE  2,428,348
FILM GATE FOR CAMERAS
Filed June 30, 1945   5 Sheets-Sheet 4
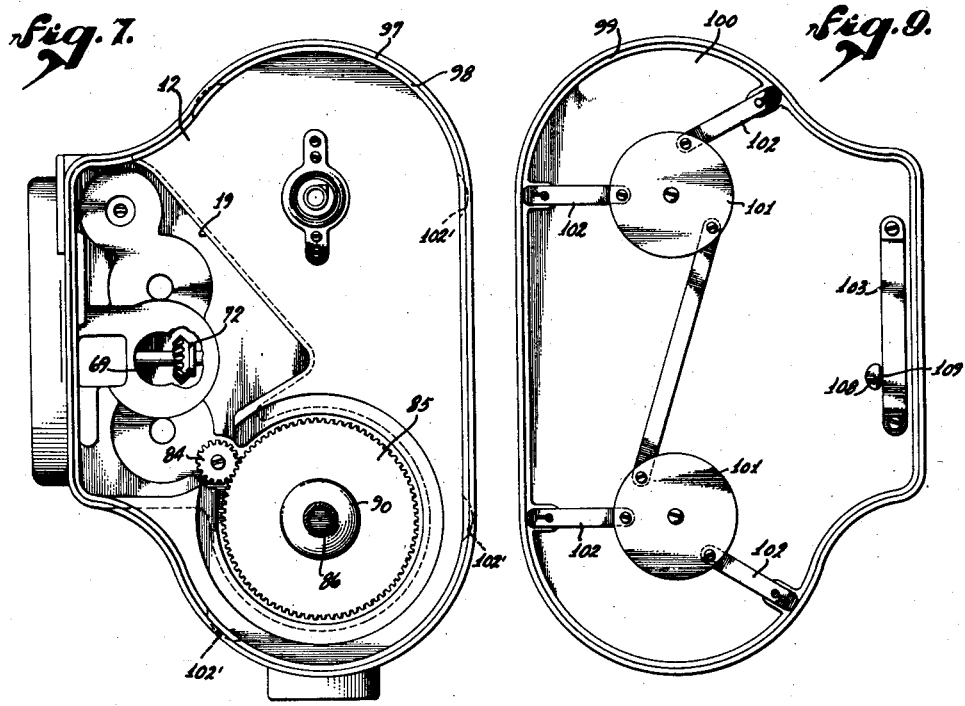
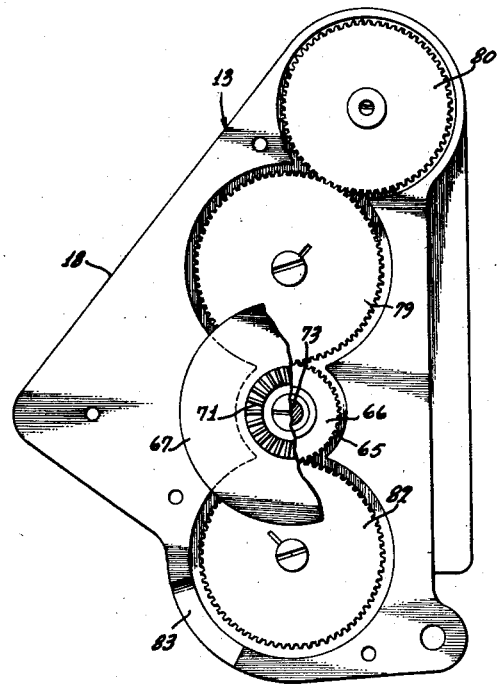
INVENTOR:
FRANK E. BIDDLE
BY
ATTORNEY.

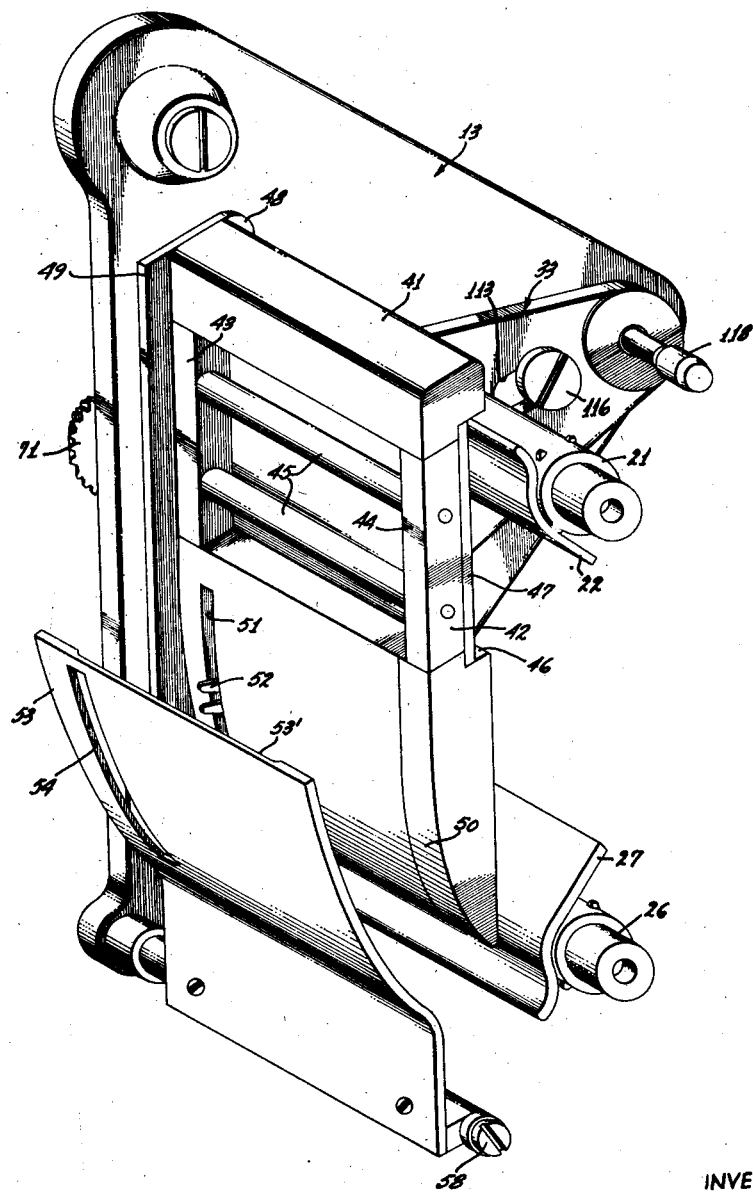

Patented Oct. 7, 1947

2,428,348

UNITED STATES PATENT OFFICE 2,428,348

FILM GATE FOR CAMERAS

Frank E. Biddle, Los Angeles, Calif., assignor, by mesne assignments, to Warner Bros. Pictures, Inc., New York, N. Y., a corporation of Delaware Application June 30, 1945, Serial No. 602,482

2 Claims. (Cl. 88—18.4)

The invention relates to a film gate for a camera and more particularly to a film gate wherein pilot or register pins are not employed. The film is prevented from overrunning the claw or pull-down mechanism by a number of features which result in friction in the gate and on the edge of the film, and the film is guided by a relatively fixed edge guide plate on which the rear edge of the film rides and by a spring pressed front plate mounted on the door. When the camera is initially threaded with film, the claw is away from the gate and it is not possible to know with certainty that the claw will engage the sprocket holes in the film when the camera is set into operation. If the claw engages an imperforate portion of the edge of the film, the film would be damaged and the film would not be propelled properly through the camera. This is overcome according to the present invention, by arranging the path of the claw longitudinally displaced in the film path away from the exposure aperture, at the rear of and projecting through a slot in the back plate which holds the film on the exposure aperture. In front of the back plate is arranged a movable front plate curved to conform to the path of the claw and to the curvature of the back plate beyond the exposure aperture, and this curved front plate is provided with a companion slot through which the claw projects. The curved front plate is urged towards the back plate by spring pressure to hold the film on the claw when the claw properly engages the sprocket holes in the film, and more particularly to allow the film to move away from the back plate in the event that the claw engages an imperforate portion of the edge of the film when initially setting the camera into operation, as above explained.

For further details of the invention reference may be made to the drawings wherein Figs. 1 and 2 are front and rear views in perspective of a motion picture camera embodying the present invention.

Fig. 4 is a sectional view on line 4—4 of Fig. 3.

Fig. 5 is a sectional view on line 5—5 of Fig. 3.

Fig. 6 is a horizontal sectional view on line 6—6 of Fig. 3.

Fig. 7 is a view corresponding to Fig. 3 on a smaller scale, with the film reels and movement mounting plate removed.

Fig. 8 is a view in elevation of the rear of the movement mounting plate.

Fig. 9 is a view in elevation of the inside of the cover of the camera, on the same scale as Fig. 7.

Fig. 10 is an enlarged perspective view of the movement mounting plate removed from the camera.

Figure 3:
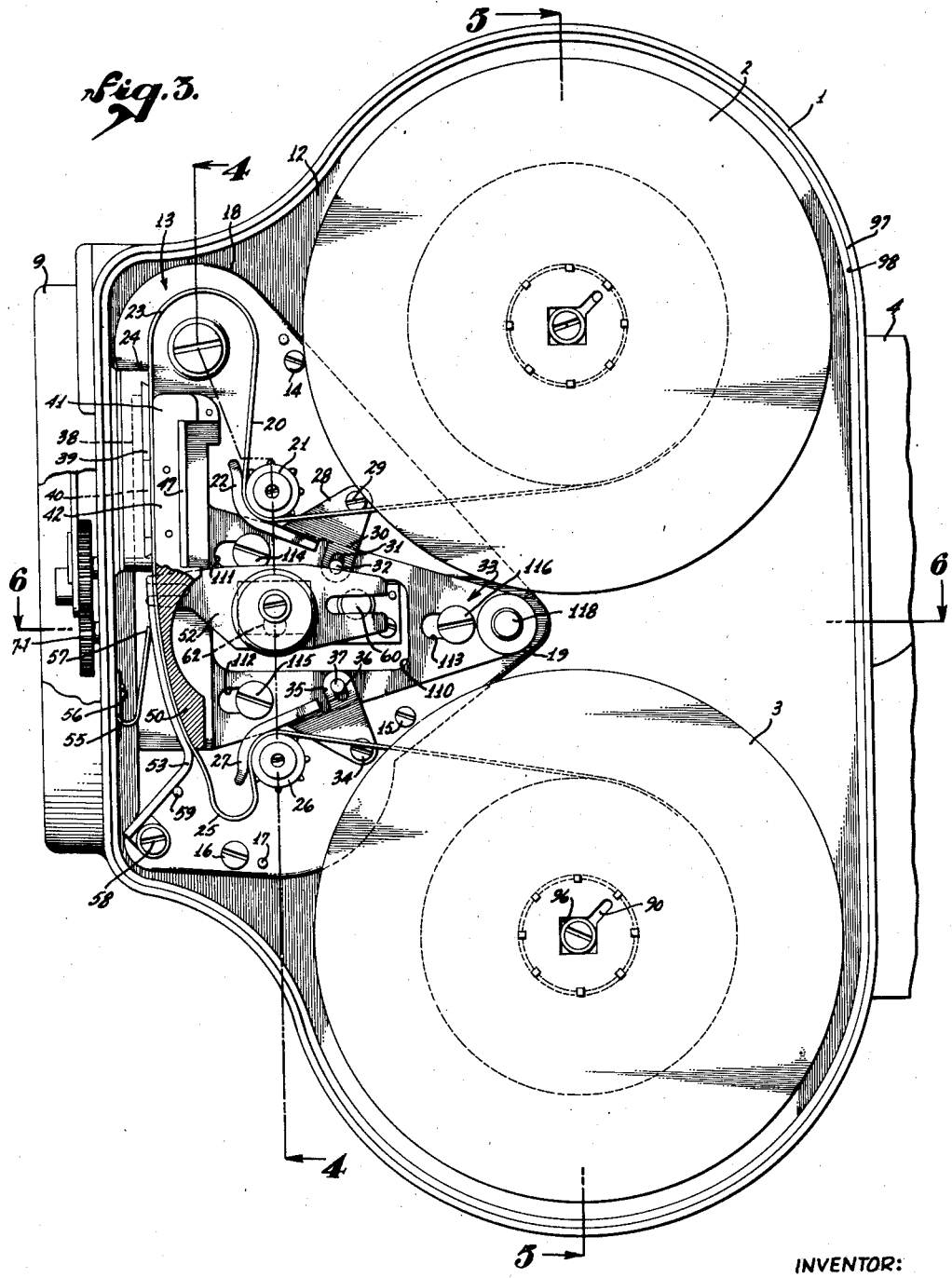
Fig. 3 is a view in elevation of the camera of Figs. 1 and 2 with parts broken away, with a portion of the film gate shown in section, and with the door of the camera removed.

Referring in detail to the drawings, the camera casing 1 houses the film supply reel 2 above the take-up reel 3. The camera is driven by a motor in the casing 4 having an electric circuit 5 and speed regulator 6. At the side of the camera is a suitable view-finder 7 operated by a handle 8. The lens turret 9 is provided with a suitable photographing lens 10 although additional lenses may be employed. The camera may be held in the hand or secured to a suitable support 11.

As shown in Fig. 3, secured to the back wall 12 of the camera is a movement mounting plate 13, held in position by suitable screws such as 14, 15, 16 and located in position by suitable positioning pins such as 17. The periphery 18 of the movement mounting plate, the rear view of which appears in Fig. 8, is roughly in the shape of an equilateral triangle with the base vertical and it fits in a correspondingly shaped recess 19 in the back wall 12 as indicated in Fig. 7. The back wall 12 is also recessed to partially house the various gears of the back of the mounting plate 13 as later described.

Referring particularly to Fig. 3, the film 20 from the supply reel 2 is led under the bottom and across the front upwardly from a supply sprocket 21 by a film guide 22. The film 20 is threaded in a free loop 23 between the sprocket 21 and the entrance of film gate 24, then downwardly through this gate, in a free loop 25 at the exit side of the gate, then upwardly across the front and top of the take-up sprocket 26 and then directly to the take-up reel 3. The film 20 is held on the front and top of sprocket 26 by a film guide 27 similar in shape to film guide 22 but reversed in position. The intermediate portion of each film guide 22 and 27 is concentric to its sprocket, while its opposite ends flare out, the rear end of guide 22 forming one end of a lever 28 pivoted to the movement mounting plate 13 at 29 at the rear of and slightly below the axis of sprocket 21. Lever 28 has on the same side of pivot 29 as the film guide 22, a lever arm 30 having a slot 31 engaged by a pin 32 on a threading plate 33.

Film guide 27 is similarly constructed and forms one arm of a lever pivoted at 34 to the movement mounting plate 13, at the rear of and slightly above the axis of sprocket 26. Film guide 27 similarly has a lever arm 35 having a slot 36 engaged by a pin 37 on the threading plate 33.

The front of the casing 1 has an aperture body 38 carrying an aperture plate 39 having an exposure aperture 40.

Secured to the threading plate 33 is a back plate 41 having a pressure pad 42 to hold the film flat on the aperture plate 39.

As shown in Fig. 10, the pressure pad 42 has vertical side rails 43 and 44 on which the edges of the film ride, the pad 42 carrying a plurality of rollers 45. The pad 42 is removably held in an opening 46 in the back plate 41 by means of a horizontal leaf spring not shown, the free end of which bears against the rear plate 47 of the pad 42, and the other end of which is suitably secured to a rear extension of the edge guide plate 48 which is suitably fixed to the back plate 41. The edge guide plate 48 at the front 49 thereof projects forwardly of the back plate 41 and serves as a straight edge against which the rear edge of the film rides.

As shown in Fig. 10, the lower portion 50 of the back plate is curved and provided with a slot 51 through which the claw 52 projects.

In front of back plate 50 is a similarly curved front plate 53 having a slot 54 like slot 51, through which the claw 52 projects when curved plate 53 is parallel to back plate 50, being urged in that position to define a channel for the film through the lower portion of the film gate, as shown in Fig. 3, by a spring 55, the front end of which is secured to the camera body as indicated at 56, and the free end 57 of which rests on the upper portion of the curved plate 53. The curved plate 53 is pivoted on a horizontal axle 58 carried by the lower front corner of the movement mounting plate 13. The rearward movement of curved plate 53 under action of the spring 55 is limited by a stop 59 on the movement mounting plate 13. The curved pressure plate 53 has a central depressed portion 53' to avoid scratching the emulsion, the sides of plate 53 holding the face edge portion of the film against the opposite sides of the back plate 50.

The spring, not shown, acting on the pressure pad 42 is comparatively weak to avoid applying enough pressure to the film to scratch the emulsion, whereas the strength of spring 55 is greater so that curved plate 53 will hold the longitudinal edges of the film against the front of the curved back plate 50.

When the camera is first set into operation, if the claw 52 does not engage a sprocket hole but instead engages an imperforate portion of the edge of the film, the spring 55 permits the claw to push both the film and the curved plate 53 away from the curved portion 50 of the back plate, the claw traveling downwardly until it slides into a sprocket hole, whereupon the spring 55 urges the curved plate 53 forwardly to push the film onto the claw 52.

As shown in Fig. 3, the claw 52 is at the front end of an arm, the rear end of which has a rocking slide pivot 60 and an intermediate cam 61 on a cam shaft 62 (see Figs. 4 and 6). Cam shaft 62 has a bearing sleeve 63 held in the movement mounting plate 13 by a nut 64. Cam shaft 62 has a gear 66 in a recess 65 at the back of the movement mounting plate 13. Behind gear 66 is a fly wheel 67. Cam shaft 62 carries a ball-bearing 68 which slidably fits in an aperture 69 in the offset back wall 70 of the camera. Cam shaft 62 terminates rearwardly in a beveled gear 71 which meshes with a driven beveled gear 72 on power shaft 73 having shutter gear 74 at its front end, and a gear 75 at its rear end. Gear 75 is driven by the motor gear 76. Gear 76 is carried by motor casing 4 and the latter is removably held on the camera casing extension 77 by suitable screws 78.

Fig. 7 illustrates the aperture 69 in back of which is the driven gear 72. Bearing 68 slides into and out of aperture 69 when movement mounting plate 13 is assembled on or removed from the back wall 12.

Referring to Fig. 8, which shows the rear of the movement mounting plate 13, the cam spur gear 66 meshes with spur gear 79 which is secured to and drives the supply sprocket 21 (see also Fig. 4), and gear 79 drives gear 80 carried by the movement mounting plate 13. The footage indicator 81 shown in Fig. 4, may be coupled to the gear 80.

At the other side of cam gear 66 is gear 82 fixed to the take-up sprocket 26. The gears 66, 79, 80 and 82 are all spur gears and are rotatably carried by the movement mounting plate 13. Plate 13 at its lower rear portion, as shown at 83, is cut away so that gear 82 will mesh with a pinion 84 (see Fig. 7) rotatably carried by the back wall 12 of the camera, pinion 84 meshing with a gear 85 which drives the take-up reel 3.

As shown in Fig. 5, gear 85 is coupled to take-up reel 3 by a friction drive here illustrated as comprising tubular shaft 86, the left end of which is of comparatively large diameter and mounted in a bearing 87 and held by the head of an end screw 88.

The enlarged end of shaft 86 has integral therewith a friction disk 89 and the gear 85 is rotatable on the shaft 86 and clamped between friction disk 89 and a spring pressed plate 90 carrying a pin 91 which extends through a slot 92 in shaft 86. Bearing on pin 91 is a plunger 93 acted on by a spring 94 having a screw plug 95. Take-up reel 3 has a non-circular coupling 96 (see Fig. 3) with the brake member 90. As shown in Figs. 4, 5, 6, 7 and 9, arising from the back wall 12 is a side wall 97 having a steppeed continuous rim 98 interfitting with the rim 99 on a door 100. The door 100 may be locked in position on the casing 1 by means of a suitable lock device 101 having a handle 119 and lock bolts such as 102 engaging apertures such as 102' in the rim 98 of the casing.

In order to hold the rear edge of the film against the edge guide plate 49, (see Fig. 10), the door 100 carries a flat straight movable edge guide plate 103 which as shown in Fig. 4, is slidably carried at its upper and lower ends of posts 104, 105 on the door 100. Bearing against the opposite ends of the movable edge guide 103 is a bow spring 106, the central portion of which is suitably secured to the inside of door 100 by means such as screws 107. As shown in Fig. 6, the edge guide 103 is of substantial width and as shown in Fig. 4 it extends lengthwise from the top of the back plate 41 to a point adjacent the take-up sprocket 26 and hence as will appear from Fig. 3, the edge guide 103 extends over the straight as well as the curved portion 50 of the back plate 41. The spring pressed edge guide 103, when door 100 is closed, is parallel to the relatively fixed edge guide plate 49. The back plate 50, aperture plate 39, and curved pressure plate 53 are slightly narrower than the film, in fact .004 inch narrower than fresh film and about .001 inch narrower than old film which has shrunk. Hence pressure edge guide 103 rides on and applies pressure to the front edge of the film to urge the rear edge of the film against fixed edge guide plate 49, through a film channel whereof the upper portion is spring pressed forwardly by the pressure pad 42 and the lower portion is spring pressed rearwardly by the curved plate 53.

As shown in Figs. 4, 6 and 9, at the rear of edge guide 103 is a lug 108 inwardly projecting from the inside of door 100. The front of lug 108 is flat as shown at 109 in Fig. 9 to extend adjacent the rear of back plate 41 and hold the latter in closed position shown in Figs. 3 and 6 to define a channel for the film. Lug 108 also prevents the door 100 from being closed if back plate 41 is in open position, as in this event the end of lug 108 would engage the side of back plate 41 and prevent closure of the door.

Threading plate 33 is slidably mounted on movement mounting plate 13, for movement in a straight line, whereas the axes of cam 61 and pivot bearing 60 are fixed in the movement mounting plate. To allow threading plate 33 to slide relatively to plate 13, threading plate 33 has an enlarged aperture 110 through which the cam shaft 62 and slide pivot bearing 60 project. Threading plate 33 has slot 111 above aperture 110, slot 112 therebelow, and slot 113 at the rear of aperture 110, these slots slidably receiving the shanks of three screws 114, 115 and 116, respectively, having heads wider than said slots. Threading plate 33 is moved back and forth by a handle 118.

When handle 118 is moved to the right as shown in Fig. 3, the back plate 41 is moved rearwardly to open position and film guides 22 and 27 are swung towards each other and forwardly away from the front of their respective sprockets 21 and 26, to open a channel for the film and permit the film to be threaded on those sprockets and through the gate 24. After the film has been threaded, with free loops 23 and 25, as shown in Fig. 3, the handle 118 is moved to the left to close the back plate 41 and pivot film guides 22 and 27 away from each other and rearwardly to the closed positions shown in Fig. 3.

The back plate 41 is held in closed position shown in Fig. 3 not only by the door lug 108, but also by friction due to the heads of screws 114 to 116 engaging the face of threading plate 33. Screws 114 to 116 are threaded into plate 13.

It will be noted that no pilot or register pins are employed. The film is prevented from overrunning or over-throwing the claw 52 due to the friction in the gate provided by the pressure pad 42 and more particularly by the friction due to the front pressure plate 53.

The invention provides a unit construction wherein substantially all of the film traversing mechanism including the threading device, is mounted on the removable movement mounting plate 13 for ease of assembly and repair. Also it is simply necessary to operate a single handle 118 to open or close the threading channel through the sprockets and gate.

A compact arrangement with the supply and take-up reels 2 and 3 close together and close to the front of the camera is provided by supporting these reels with the rear flanges thereof offset from the back wall 12 of the camera, as shown in Fig. 5, whereby the reels 2 and 3 overlap certain rear portions of the movement mounting plate 13 as shown in Fig. 3, with the rear end of threading plate 33 and handle 18 extending in the space between reels 2 and 3 as shown in Fig. 3.

The threading arrangement is disclosed and claimed in application S. N. 602,484, filed June 30, 1945, for Camera. The edge guide feature is disclosed and claimed in application S. N. 602,483, filed June 30, 1945, for Film guide for camera.

It will be apparent that various modifications may be made in the invention without departing from the spirit of the following claims.

I claim:

1. A camera casing having an exposure aperture member, a movable back plate therefor, said back plate having a pressure pad therein for said aperture member, said pressure pad and said aperture member providing a straight channel portion for the film, a claw movement behind said back plate, said back plate below said pressure pad having a curved face and an elongated aperture therein to receive the claw, a correspondingly curved front pressure plate having a companion elongated aperture to receive the claw, said curved front plate having a raised central portion to escape the film emulsion and lateral film engaging edges, a pivotal support crosswise of said casing below said back plate for said curved front plate, spring means for urging said curved front plate towards said curved back plate portion, and stop means limiting movement of said curved front plate by said spring to expose said claw when said back plate is withdrawn.

2. A film gate having consecutive film channel portions and a movable gate member common to both thereof, wherein one of said film channel portions comprises a flat exposure aperture member and a pressure pad on said movable gate member for pressing the film forwardly against said aperture member, the other film channel portion comprising a spring pressed plate for urging the film rearwardly against said movable gate member, film traversing mechanism having a claw, aligned slots in said spring pressed plate and in said movable gate member for said claw, and means supporting said movable gate member for opening movement inwardly along said claw to expose said claw for manual threading.

FRANK E. BIDDLE.

REFERENCES CITED

The following references are of record in the file of this patent:

UNITED STATES PATENTS

| Number | Name | Date |
| --- | --- | --- |
| 1,944,031 | Lang et al. | Jan. 16, 1934 |